United States Patent
Wang et al.

(10) Patent No.: US 9,354,130 B2
(45) Date of Patent: May 31, 2016

(54) TORQUE MEASUREMENT DEVICE FOR STEERING WHEEL

(75) Inventors: Haifeng Wang, Guangdong (CN); Dirk Enderlein, Waltrop (DE); Mitch Thompson, Exton, PA (US); Axel Bartos, Waltrop (DE)

(73) Assignee: MEASUREMENT SPECIALTIES (CHINA), LTD., Guangdong (CN)

( * ) Notice: Subject to any disclaimer, the term of this patent is extended or adjusted under 35 U.S.C. 154(b) by 190 days.

(21) Appl. No.: 14/128,466

(22) PCT Filed: May 28, 2012

(86) PCT No.: PCT/CN2012/076140
§ 371 (c)(1),
(2), (4) Date: May 23, 2014

(87) PCT Pub. No.: WO2013/000350
PCT Pub. Date: Jan. 3, 2013

(65) Prior Publication Data
US 2014/0290386 A1 Oct. 2, 2014

(30) Foreign Application Priority Data

Jun. 27, 2011 (CN) .................... 2011 2 0221400 U

(51) Int. Cl.
*G01L 3/02* (2006.01)
*G01L 3/10* (2006.01)
*B62D 6/10* (2006.01)

(52) U.S. Cl.
CPC . *G01L 3/101* (2013.01); *B62D 6/10* (2013.01); *G01L 3/104* (2013.01); *G01L 3/105* (2013.01)

(58) Field of Classification Search
CPC ......... G01L 3/104; G01L 3/101; G01L 3/105; B62D 6/10
USPC ...................... 73/862.193, 862.335, 862.331, 73/862.333, 862.334–862.337
See application file for complete search history.

(56) References Cited

U.S. PATENT DOCUMENTS

| 6,367,337 B1 * | 4/2002 | Schlabach ................ 73/862.331 |
| 6,698,299 B2 * | 3/2004 | Cripe ....................... 73/862.331 |
| 7,497,132 B2 | 3/2009 | Harata et al. |
| 2004/0016305 A1 * | 1/2004 | Matsumoto et al. ..... 73/862.331 |

FOREIGN PATENT DOCUMENTS

| CN | 1952637 A | 4/2007 |
| CN | 202133493 U | 2/2012 |
| DE | 102009039764 A1 | 3/2011 |
| EP | 1772716 A1 | 4/2007 |
| JP | 3641740 A | 8/2000 |
| JP | 2000221087 A | 8/2000 |

(Continued)

OTHER PUBLICATIONS

International Search Report dated Aug. 2, 2012 issued in connection with related International Application No. PCT/CN2012/076140.

*Primary Examiner* — Lisa Caputo
*Assistant Examiner* — Brandi N Hopkins
(74) *Attorney, Agent, or Firm* — Howard IP Law Group

(57) ABSTRACT

A measuring device for steering wheel torque includes a magnetic sensor to measure a rotational torque of the steering wheel. The measuring device for steering wheel torque has the advantages of high measuring precision, non-contact, high reliability and low cost.

2 Claims, 1 Drawing Sheet

(56) References Cited

FOREIGN PATENT DOCUMENTS

| | | |
|---|---|---|
| JP | 2007101422 A | 4/2007 |
| JP | 4886264 B2 | 2/2012 |
| KR | 20100040535 A | 4/2010 |
| WO | 2010041796 A1 | 4/2010 |

\* cited by examiner

TORQUE MEASUREMENT DEVICE FOR STEERING WHEEL

CROSS REFERENCE TO RELATED APPLICATIONS

This application is a national stage application under 35 U.S.C. §371 of the International Application No. PCT/CN2012/076140, filed May 28, 2012, and claims the benefit of Chinese Application No. 201120221400.7, filed Jun. 27, 2011, the entire disclosures of which are incorporated herein by reference.

TECHNICAL FIELD

The present invention relates to measurement field, in particular, to a measuring device for steering wheel torque.

BACKGROUND

An electric power steering system provides steering assist directly by a power steering motor, eliminating a pump, a hose, hydraulic oil, a belt, and a pulley mounted on an engine, which are necessary for a hydraulic power steering system, so the system saves energy and protects the environment.

In the electric power steering system, a steering wheel torque needs to be measured in order to achieve a control of the power steering motor output torque, but the measurement of the steering wheel torque now adopts a slider, an electric brush and other mechanical components, which has a problem of low precision and high cost.

SUMMARY

A technical problem solved by the present invention is to provide a measuring device for a steering wheel torque which solves the low precision and high cost of the present measuring device for a steering wheel torque.

The present invention is realized as follows: A measuring device for a steering wheel torque is coupled with the power steering motor control circuit. The measuring device for a steering wheel torque includes a magnetic pole, a magnetic sensor for measuring the displacement of the pole, a first coil, a second coil, an oscillation exciting circuit, a decoding circuit, a power supply circuit, a detection circuit and a control circuit. The second coil winds on a flexible shaft or a rotating shaft of the steering wheel, and rotates together with the flexible shaft or the rotating shaft. The first coil surrounds an outside of the second coil, and has a certain space with the second coil. The first coil is fixed, and can not rotate with the flexible shaft or the rotating shaft. The first coil is coupled with the second coil. The magnetic pole is located on an upper rotating shaft or a lower rotating shaft of the steering wheel. The magnetic sensor is fixed on the lower rotating shaft or the upper rotating shaft of the steering wheel. The two output terminals of the oscillation exciting circuit are respectively coupled to the two ends of the first coil, and the two ends of the second coil are coupled to an input terminal of the power supply circuit. An output terminal of the power supply circuit are coupled to the magnetic sensor, the detection circuit and a power supply terminal of the control circuit respectively. An output terminal of the magnetic sensor is coupled to an analog digital conversion terminal of the detection circuit. An output terminal of the detection circuit is coupled to an input terminal of the control circuit. An output terminal of the control circuit is coupled to the second coil. Two ends of the decoding circuit are coupled to the two ends of the first coil respectively, and an output terminal of the decoding circuit is coupled to power steering motor control circuit.

In the above-described structure, the power supply circuit includes a diode D1 and a voltage conditioning unit. A first input terminal of the voltage conditioning unit is coupled to a first end of the second coil via the diode D1. A second input terminal of the voltage conditioning unit is coupled to a second end of the second coil. An output terminal of the voltage conditioning unit is coupled to the magnetic sensor. The detection circuit and the power supply terminal of the control circuit simultaneously.

In the above-described structure, the detection circuit adopts a micro-controller chip, a power supply terminal is coupled to the output terminal of the power supply circuit, an analog digital conversion terminal of the micro-controller chip is coupled to the output terminal of the magnetic sensor, an output terminal of the micro-controller chip is coupled to the input of the control circuit.

In the embodiment of the present invention, the measuring device for a steering wheel torque adopts a magnetic sensor to measure the rotational torque of the steering wheel, the measuring device for a steering wheel torque has the advantages of high measuring precision and low cost.

DETAILED DESCRIPTION OF THE PREFERRED EMBODIMENTS

The realization, functional characteristics, advantages and embodiments of the present invention will be explained below in detail with reference to the accompanying drawings.

It is to be appreciated that the following description of the embodiment(s) is merely exemplary in nature and is no way intended to limit the present invention, its application, or uses.

Figure 1:
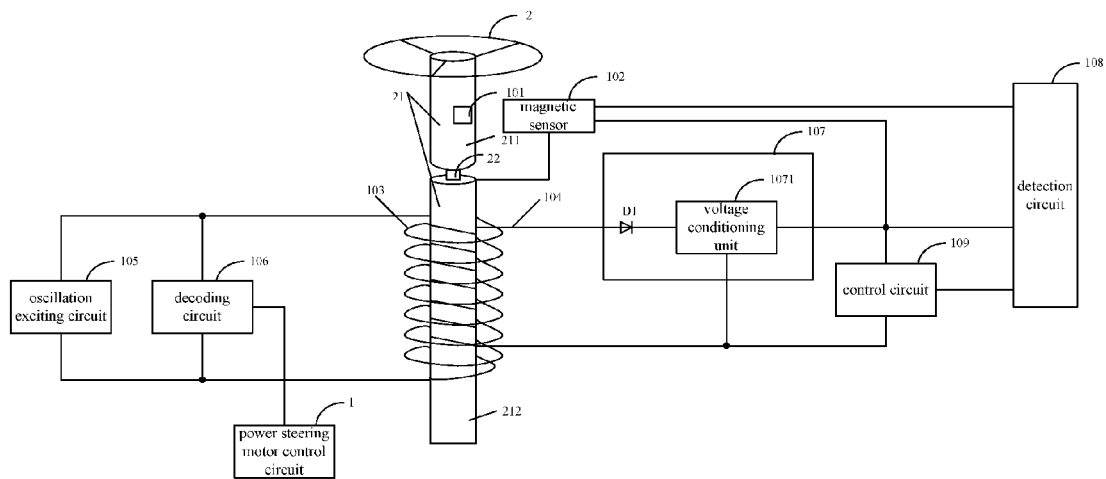
FIG. 1 is a block diagram of a measuring device for a steering wheel torque in accordance with an embodiment of the present invention.

FIG. 1 shows a block diagram of the measuring device for a steering wheel torque in accordance with the embodiment of the present invention, for easy illustration, only the portions related with the embodiment of the present invention are shown and described in detail.

A measuring device for a steering wheel torque is coupled to a power steering motor control circuit 1, the measuring device for a steering wheel torque includes: a magnetic pole 101, a magnetic sensor 102 for measuring the displacement of the magnetic pole 101, a first coil 103, a second coil 104, an oscillation exciting circuit 105, a decoding circuit 106, a power supply circuit 107, a detection circuit 108 and a control circuit 109. The second coil 104 winds on a flexible shaft 22 or a rotating shaft 21 of the steering wheel 2, and rotates together with the flexible shaft 22 or the rotating shaft 21, the first coil 103 surrounds an outside of the second coil 104, and has a certain space with the second coil 104, the first coil 103 is fixed, and can not rotate with the flexible shaft 22 or the rotating shaft 21, and the first coil 103 is coupled with the second coil 104, the magnetic pole 101 is located on an upper rotating shaft 211 or a lower rotating shaft 212 of the steering wheel 2, the magnetic sensor 102 is fixed on the lower rotating shaft 212 or the upper rotating shaft 211 of the steering wheel 2. In the embodiment of the present invention, the magnetic pole 101 is located on the upper rotating shaft 211 of the steering wheel 2, the magnetic sensor 102 is fixed on the lower rotating shaft 212 of the steering wheel 2, the two output terminals of the oscillation exciting circuit 105 are respectively coupled to the two ends of the first coil 103, the two ends of the second coil 104 are coupled to an input terminal of the power supply circuit 107, an output terminal of the power supply circuit 107 are coupled to the magnetic sensor 102, the detection circuit 108 and the power supply terminal of the control circuit 109 respectively, an output terminal of the magnetic sensor 102 is coupled to an analog digital conversion terminal of the detection circuit 108, an output terminal of the detection circuit 108 is coupled to an input terminal of the control circuit 109, an output terminal of the control circuit 109 is coupled to the second coil 104, the two ends of the decoding circuit 106 are coupled to the two ends of the first coil 103 respectively, an output terminal of the decoding circuit 106 is coupled to the power steering motor control circuit 1.

As an embodiment of the present invention, the power supply circuit 107 includes a diode D1 and a voltage conditioning unit 1071. A first input terminal of the voltage conditioning unit 1071 is coupled to a first end of the second coil 104 via the diode D1, a second input terminal of the voltage conditioning unit 1071 is coupled to a second end of the second coil 104, an output terminal of the voltage conditioning unit 1071 is coupled to the magnetic sensor 102, the detection circuit 108 and the power supply terminal of the control circuit 109 simultaneously.

Figure 2:
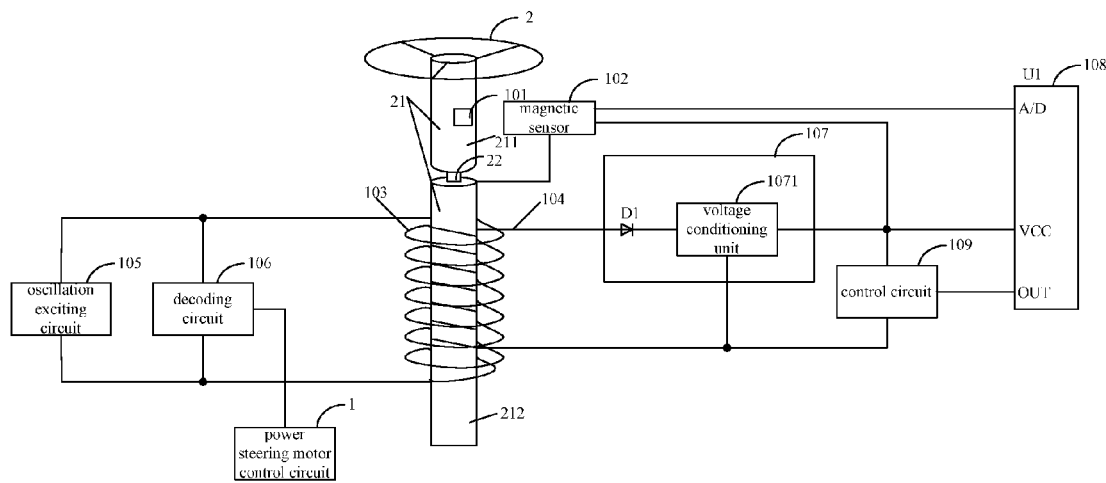
FIG. 2 is a block diagram of a micro-controller chip of the measuring device for a steering wheel torque in accordance with the embodiment of the present invention.

FIG. 2 shows a block diagram of the micro-controller chip of the measuring device for a steering wheel torque in accordance with the embodiment, in the present invention, for easy illustration, only the portions related with the embodiment of the present invention are shown and described in detail.

As another embodiment of the present invention, the detection circuit 108 adopts a micro-controller chip U1, a power supply terminal VCC of the micro-controller chip U1 is coupled to the output terminal of the power supply circuit 107, an analog digital conversion terminal A/D of the micro-controller chip U1 is coupled to the output terminal of the magnetic sensor 102, the output terminal OUT of the micro-controller chip U1 is coupled to the input of the control circuit 109.

The working principle of the measuring device for a steering wheel torque is described as follows.

The oscillation exciting circuit 105 provides electrical energy to the first coil 103, the first coil 103 transmits the electrical energy to the second coil 104 by coupling, the power supply circuit 107 processes the electrical energy which is then provided to the magnetic sensor 102, the detection circuit 108 and control circuit 109, when the steering wheel is rotated, the magnetic sensor 102 measures the steering wheel torque by measuring the movement of the magnetic pole 101, the magnetic sensor 102 sends the measuring result signal to the micro-controller chip U1, the micro-controller chip U1 processes the measuring result signal which is then sent to the control circuit 109 by the output terminal OUT for processing, the control circuit 109 transmits the measuring result signal to the second coil 104, the second coil 104 transmits the measuring result signal to the first coil 103 by the coupling, the decoding circuit 106 decodes the measurement signal which is then output to the power steering motor control circuit 1.

In the embodiment of the present invention, the measuring device for a steering wheel torque adopts a magnetic sensor to measure the rotational torque of the steering wheel, the measuring device for a steering wheel torque has the advantages of high measuring precision and low cost.

The above-mentioned description is only a preferred embodiment of the present invention, which is not therefore limit the patent range of the present invention. Any equivalent structures, or equivalent processes transform or the direct or indirect use in other related technical fields made by the specification and the drawings of the present invention are similarly included the range of the patent protection of the present invention.

The invention claimed is:

1. A measuring device for a steering wheel torque, comprising:
   a magnetic pole located on a rotating shaft of the steering wheel;
   a magnetic sensor for measuring the displacement of the magnetic pole, the magnetic sensor fixed on the rotating shaft of the steering wheel;
   a first coil and a second coil, the second coil wound on a flexible shaft or the rotating shaft of the steering wheel and configured to rotate therewith, the first coil surrounding the second coil and fixed such that it can not rotate with the flexible shaft or the rotating shaft;
   an oscillation exciting circuit comprising two output terminals coupled to respective ends of the first coil;
   a control circuit including an output terminal coupled to the second coil;
   a decoding circuit having two ends coupled to respective ends of the first coil and an output terminal coupled to a power steering motor control circuit;
   a power supply circuit comprising:
      a diode; and
      a voltage conditioning unit, wherein a first input terminal of the voltage conditioning unit is coupled to a first end of the second coil via the diode, wherein a second input terminal of the voltage conditioning unit is coupled to a second end of the second coil, and wherein an output terminal of the voltage conditioning unit is coupled to the magnetic sensor, the detection circuit and the power supply terminal of the control circuit; and
   a detection circuit including an analog to digital conversion terminal coupled to an output terminal of the magnetic sensor and an output terminal coupled to an input terminal of the control circuit.

2. A measuring device for a steering wheel torque, comprising:
   a magnetic pole located on a rotating shaft of the steering wheel;
   a magnetic sensor for measuring the displacement of the magnetic pole, the magnetic sensor fixed on the rotating shaft of the steering wheel;
   a first coil and a second coil, the second coil wound on a flexible shaft or the rotating shaft of the steering wheel and configured to rotate therewith, the first coil surrounding the second coil and fixed such that it can not rotate with the flexible shaft or the rotating shaft;
   an oscillation exciting circuit comprising two output terminals coupled to respective ends of the first coil;
   a control circuit including an output terminal coupled to the second coil;
   a decoding circuit having two ends coupled to respective ends of the first coil and an output terminal coupled to a power steering motor control circuit;
   a power supply circuit including an input terminal coupled to two ends of the second coil and an output terminal coupled to the magnetic sensor, the detection circuit and the power supply terminal of the control circuit; and a, detection circuit including a micro-controller chip having a power supply terminal coupled to the output terminal of the power supply circuit, an analog digital conversion terminal coupled to the output terminal of the magnetic sensor, and an output terminal coupled to the input terminal of the control circuit.

* * * * *

UNITED STATES PATENT AND TRADEMARK OFFICE
CERTIFICATE OF CORRECTION

PATENT NO. : 9,354,130 B2
APPLICATION NO. : 14/128466
DATED : May 31, 2016
INVENTOR(S) : Haifeng Wang et al.

Page 1 of 1

It is certified that error appears in the above-identified patent and that said Letters Patent is hereby corrected as shown below:

In the claims,

Claim 2, column 5, line 1, reads "a, detection circuit" please delete the "," so that the line reads "a detection circuit".

Signed and Sealed this
Ninth Day of August, 2016

Michelle K. Lee
*Director of the United States Patent and Trademark Office*